United States Patent [19]

Lotsch et al.

[11] Patent Number: 4,746,740
[45] Date of Patent: May 24, 1988

[54] ISOINDOLINE COLORANTS

[75] Inventors: Wolfgang Lotsch, Beindersheim; Reinhard Kemper, Heidelberg, both of Fed. Rep. of Germany

[73] Assignee: BASF Aktiengesellschaft, Ludwigshafen, Fed. Rep. of Germany

[21] Appl. No.: 886,318

[22] Filed: Jul. 17, 1986

[51] Int. Cl.$^4$ .............................................. C09B 57/04
[52] U.S. Cl. ........................................ 544/300; 548/471; 106/23; 106/288 Q
[58] Field of Search ............................................. 544/300

[56] References Cited

U.S. PATENT DOCUMENTS

| | | | |
|---|---|---|---|
| 4,316,023 | 2/1982 | Henning et al. | 544/300 |
| 4,371,735 | 2/1983 | Scherer et al. | 544/300 |
| 4,400,507 | 8/1983 | von der Crone | 544/300 |
| 4,401,815 | 8/1983 | Lotsch et al. | 544/300 |
| 4,564,680 | 1/1986 | Rolf et al. | 544/300 |

FOREIGN PATENT DOCUMENTS

| | | | |
|---|---|---|---|
| 1140130 | 1/1983 | Canada | 544/300 |
| 2757982 | 6/1979 | Fed. Rep. of Germany | 544/300 |
| 190692 | 8/1986 | Fed. Rep. of Germany | 544/300 |
| 1601555 | 10/1981 | United Kingdom . | |

Primary Examiner—Donald G. Daus
Assistant Examiner—Cecilia Shen
Attorney, Agent, or Firm—Oblon, Fisher, Spivak, McClelland & Maier

[57] ABSTRACT

Isoindoline colorants of the formula

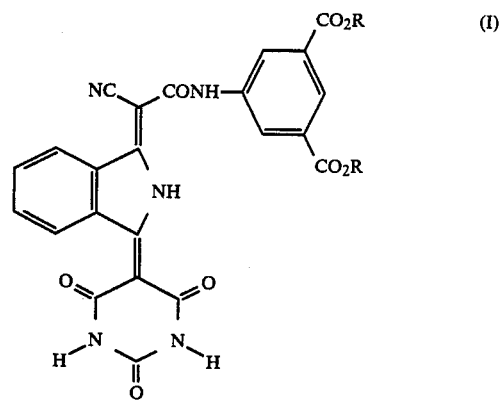

where the radicals R independently of one another are each methyl or ethyl, give neutral yellow colorations when incorporated into surface coatings. The colorations do not darken on weathering and, compared with prior art pigments, exhibit improved gloss stability on weathering.

3 Claims, No Drawings

ISOINDOLINE COLORANTS

This invention relates to isoindoline colorants.

German Laid-Open Application DOS No. 2,814,526 describes isoindoline pigments which are prepared by stepwise condensation of diiminoisoindoline with a cyanoacetanilide and then with one molecule of barbituric acid. These reddish yellow to red pigments possess excellent fastness to migration and lightfastness and are therefore also suitable for pigmenting high quality finishes, for example for the automotive sector. The disadvantage, however, is that finishes pigmented with the stated pigments in shades close to full shade darken to a greater or lesser extent on weathering. A further disadvantage is that the purity of shade does not meet the highest requirements.

It is an object of the present invention to provide pigments based on 1,3-diiminoisoindoline which possess improved tinctorial properties.

We have found that good results are achieved by isoindoline colorants of the formula (I)

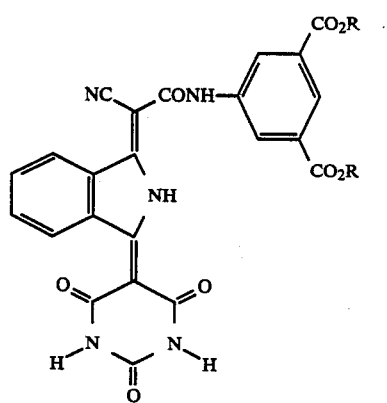

(I)

where the radicals R independently of one another are each methyl or ethyl. The colorants (I) give very pale and pure colorations in neutral yellow hues which, surprisingly, do not darken on weathering. Moreover, compared with the very similar colorant disclosed in German Laid-Open Application DOS Nos. 2,814,526, Example 34, and containing a carbomethoxy group ortho to the amide nitrogen, the colorants (I) exhibit substantially improved gloss stability on weathering.

Preferred colorants (I) are those in which the two radicals R are identical. The colorant (I) in which the two radicals R are each methyl is particularly preferred.

The colorants (I) may be prepared in a conventional manner by condensing the corresponding ester of N-cyano-acetyl-5-aminoisophthalic acid with diiminoisoindoline in a molar ratio of 1:1 to give the corresponding semi-condensate of the formula II

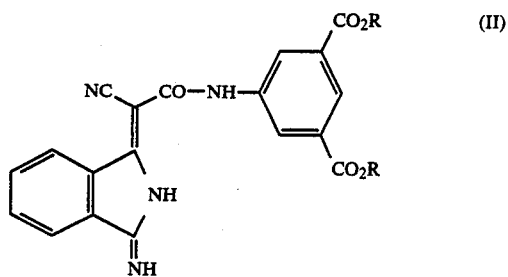

(II)

which, in the second stage, is condensed with barbituric acid to give the colorant of the formula (I). In formula (II), R has the above meanings.

The colorants can be used in the form obtained in their synthesis and possess excellent fastness properties even in this form. Advantageously, however, the crude pigment is conditioned to convert it to an optimum pigmentary form for the intended use.

The colorants (I) are suitable for pigmenting surface coatings, printing inks and plastics.

The Examples which follow illustrate the invention. Parts are by weight.

EXAMPLE 1

(a) 28 parts of dimethyl N-cyanoacetyl-5-aminoisophthalate are stirred with 21 parts of the ethylene glycol adduct with diiminoisoindoline in 300 parts of methanol for 5 hours at the boil. The mixture is filtered while hot, and the residue is washed with methanol and dried to give 32 parts of the semicondensate of the formula (III)

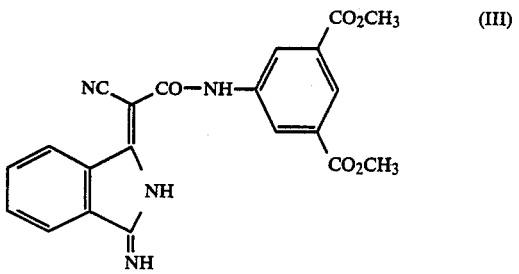

(III)

in the form of a lemon yellow powder which melts at 330°–332° C.

(b) 41 parts of the semicondensate of the formula III from 1(a) are stirred together with 13 parts of barbituric acid in 600 parts of glacial acetic acid for 5 hours at the boil. The mixture is cooled to 80° C. and then filtered, and the residue is washed with glacial acetic acid and methanol and dried to give 49 parts of the colorant of the formula (IV)

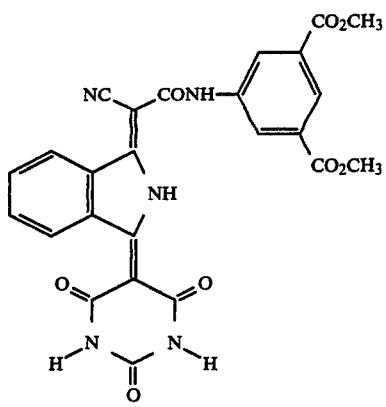

(IV)

which, when incorporated into surface coatings, gives neutral yellow colorations having good purity of shade and excellent fastness properties.

(c) 50 parts of the crude pigment obtained as described in 1(b) are milled for 4 hours in a planetary ball mill containing 20 agate balls of 1 cm diameter and 20 agate balls of 2 cm diameter.

(d) The highly compacted yellow finished mill base 1(c), which consists of agglomerates comprising primary particles of <0.1 μm, is introduced into 300 parts of methyl benzoate and stirred for seven hours at 100° C. The mixture is cooled to 30° C. and then filtered, and the residue is washed ester-free with methanol and dried to give 45 parts of a pigmentary form of the colorant (IV), which has color strength, brilliance and gloss properties superior to those of the colorant obtained as described in 1(b), but otherwise has similar fastness properties.

(e) Compared with the very similar colorant of the formula (V)

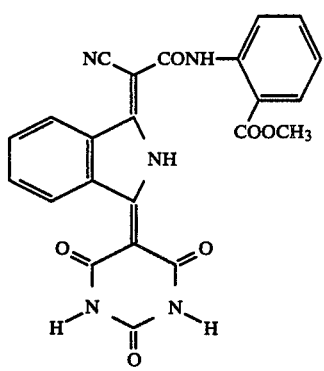

which is disclosed in German Laid-Open Application DOS No. 2,814,526, Example 34, and has been conditioned in the same manner as the novel colorant according to (c) and (d), the colorant according to the invention is distinguished in particular by better gloss stability on weathering.

EXAMPLE 2

The procedure described in Example 1(a) to 1(d) is followed, except that, instead of dimethyl N-cyanoacetyl-5-aminoisophthalate, the corresponding diethyl ester is used, and the colorant of the formula (VI)

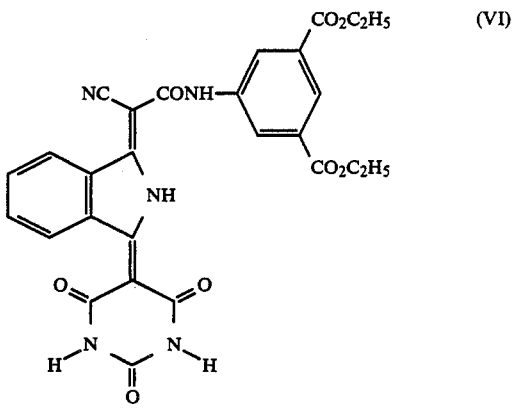

is obtained. When incorporated into surface coatings, this colorant gives colorations having similar fastness properties.

We claim:

1. An isoindoline colorant of the formula

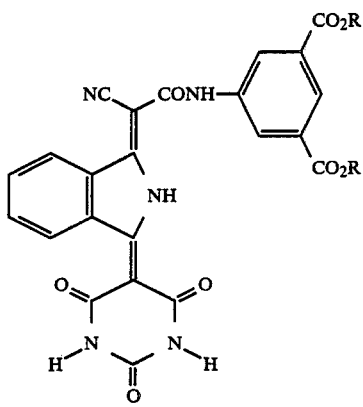

where the R's independently of one another are each methyl or ethyl.

2. An isoindoline colorant as claimed in claim 1, wherein both R's are methyl or ethyl.

3. An isoindoline colorant as claimed in claim 2, wherein both R's are methyl.

* * * * *

UNITED STATES PATENT AND TRADEMARK OFFICE
CERTIFICATE OF CORRECTION

PATENT NO. : 4,746,740

DATED : May 24, 1988

INVENTOR(S) : Wolfgang Lotsch, et al.

It is certified that error appears in the above-identified patent and that said Letters Patent is hereby corrected as shown below:

On the title page:

The following Foreign Application Priority Data should be noted:

-- Jul. 22, 1985 [DE] Fed. Rep. of Germany.....3526099 --

Signed and Sealed this

Seventeenth Day of April, 1990

Attest:

HARRY F. MANBECK, JR.

*Attesting Officer*  *Commissioner of Patents and Trademarks*